(12) United States Patent
Xu et al.

(10) Patent No.: US 12,123,579 B2
(45) Date of Patent: Oct. 22, 2024

(54) LED LAMP

(71) Applicant: SHENZHEN SNC OPTO ELECTRONIC CO., LTD, Shenzhen (CN)

(72) Inventors: Jianyong Xu, Shenzhen (CN); Jianjun Xu, Shenzhen (CN); Liang Qiu, Shenzhen (CN); Chao Xu, Shenzhen (CN)

(73) Assignee: SHENZHEN SNC OPTO ELECTRONIC CO., LTD, Shenzhen (CN)

( * ) Notice: Subject to any disclaimer, the term of this patent is extended or adjusted under 35 U.S.C. 154(b) by 12 days.

(21) Appl. No.: 18/218,019

(22) Filed: Jul. 4, 2023

(65) Prior Publication Data
US 2024/0200761 A1    Jun. 20, 2024

(30) Foreign Application Priority Data

Dec. 19, 2022 (CN) .......................... 202211635168.0

(51) Int. Cl.
| | |
|---|---|
| *F21V 21/30* | (2006.01) |
| *F21S 4/28* | (2016.01) |
| *F21V 23/06* | (2006.01) |
| *F21Y 115/10* | (2016.01) |

(52) U.S. Cl.
CPC ................ *F21V 21/30* (2013.01); *F21S 4/28* (2016.01); *F21V 23/06* (2013.01); *F21Y 2115/10* (2016.08)

(58) Field of Classification Search
CPC ...... F21Y 2115/10; F21V 23/06; F21V 21/30; F21S 4/28
See application file for complete search history.

(56) References Cited

U.S. PATENT DOCUMENTS

| | | | |
|---|---|---|---|
| 10,830,420 B2* | 11/2020 | Van Der Schyf | H02G 11/00 |
| 11,255,515 B2* | 2/2022 | Daly | F21V 21/30 |

OTHER PUBLICATIONS

Innovation Q+ NPL Search (Year: 2023).*

* cited by examiner

*Primary Examiner* — Anabel Ton

(57) ABSTRACT

An LED lamp includes a middle component and two light frames; wherein the two light frames are respectively and rotatably connected on two sides of the middle component; each light frame comprises two connecting tubes which are opposite to and spaced with each other, and at least one LED light module is connected between the two connecting tubes. The LED light module includes a heat sink and at least one LED light board installed on the heat sink; the LED light module is rotatably connected with the connecting tube. Since the light frames are rotatably connected with the middle component, the LED lamp can be folded to facilitate product packaging.

19 Claims, 5 Drawing Sheets

LED LAMP

CROSS REFERENCE TO RELATED APPLICATIONS

This application claims priority to Chinese Patent Application No. 202211635168.0, entitled "LED LAMP" and filed on Dec. 19, 2022, the content of which is hereby incorporated by reference in its entirety.

TECHNICAL FIELD

The present disclosure belongs to the field of lighting devices, and more particularly to an LED lamp which can adjust the irradiation angle of an LED light module.

BACKGROUND

LED lamps can be used to provide light required by photosynthesis of indoor plants. In order to save planting space and improve planting efficiency, LED lamps with three-dimensional structures were adopted in many indoor planting places.

The existing LED lamp usually includes multiple LED light modules, each of which includes a heat sink, an LED light plate mounted on the heat sink, and a lens plate covering the LED light plate. The irradiation angle of each LED light module of the existing LED lamps is unable to be flexibly adjusted, thus light is unable to evenly irradiate on three-dimensional planting plants, which affects the quality and growth efficiency of plants.

For example, plants located directly below the LED lamp may get more light than they need, while plants located on the side of the LED lamp do not get enough light, resulting in uneven plant growth on above two areas. On the other hand, types and arrangements of plants planted in different seasons are different, and the sizes of the plants planted in different growth cycles are also different, under these, it is necessary to precisely adjust the irradiation angle to raise the quality and growth efficiency of plants.

Therefore, it is necessary to improve the existing LED lamps.

SUMMARY

The purpose of the present disclosure is to provide an LED lamp, and the irradiation angle of an LED light module of the LED lamp can be adjusted.

For the above purposes, technical proposals in the present disclosure can be:

An LED lamp, including a middle component; and two light frames, the two light frames being respectively and rotatably connected on two sides of the middle component; each light frame including two connecting tubes, the two connecting tubes being opposite to and spaced with each other; and at least one LED light module, the at least one LED light module being rotatably connected between the two connecting tubes.

In some embodiments, the LED light module comprises a lamp body and a connector connected with the lamp body; a rotating shaft is arranged on the connector; the connecting tube comprises a connecting plate and a cover plate connected to the connecting plate; a shaft hole is defined in the connecting plate; the rotating shaft is inserted in the shaft hole.

In some embodiments, the connector comprises a plurality of concave surfaces arranged along the circumference of the rotating shaft; the connecting plate is connected with a limiter, and a ball is retractably arranged on one end of the limiter; the ball is matched with any of the concave surfaces to be received in a space formed by any of the concave surfaces.

In some embodiments, the limiter includes a shell and a spring located in the shell; a part of the ball is exposed to the shell, the other part of the ball is located in the shell and contacts the spring; the shell is connected with the connecting plate.

In some embodiments, an arc groove is defined in the connector; the plurality of concave surfaces are located in the arc groove, and a part of the shell extends into the arc groove.

In some embodiments, the outer surface of the rotating shaft includes threads; a nut is arranged in the connecting plate; the nut is connected with the rotating shaft; the shell is threaded with the connecting plate; a first wire hole is defined in the rotating shaft.

In some embodiments, the middle component includes a power box and an LED drive power located in the power box; the power box is long strip shaped; a first end cover is separately arranged on two ends of the power box; a second end cover is arranged on an end of the connecting tube; the first end cover is hinged with the second end cover.

In some embodiments, a middle portion of the first end cover is connected with a terminal; an "L"-shaped notch is separately defined in two opposite sides of the first end cover, and each second end cover is located in one "L"-shaped notch.

In some embodiments, a second wire hole is curved and is defined through a bottom wall of the "L"-shaped notch.

In some embodiments, the connecting tube includes a connecting plate and an outer cover plate; an inner side of the connecting plate is connected with a pendant; a hook hole is defined in the pendant; the limiter is fixed on the connecting plate; the power box includes a base and an upper cover connected with the base; the LED light module includes a heat sink, at least one LED light board mounted on the heat sink, and a lens board covering the LED light board.

An LED lamp, including two light frames, the two light frames being relatively rotatable to each other; each light frame including two connecting tubes, the two connecting tubes being opposite to and spaced with each other; and at least one LED light module, the at least one LED light module being rotatably connected between the two connecting tubes.

In some embodiments, the LED light module includes a lamp body and a connector connected with the lamp body; a rotating shaft is arranged on the connector; the connecting tube includes a connecting plate and a cover plate connected to the connecting plate; a shaft hole is defined in the connecting plate; the rotating shaft is inserted in the shaft hole.

In some embodiments, the connector includes a plurality of concave surfaces arranged along the circumference of the rotating shaft; the connecting plate is connected with a limiter, and a ball is retractably arranged on one end of the limiter; the ball is matched with any of the concave surfaces to be received in a space formed by any of the concave surfaces.

In some embodiments, an arc groove is defined in the connector; the plurality of concave surfaces are located in the arc groove, and a part of the shell extends into the arc groove.

In some embodiments, the limiter includes a shell and a spring located in the shell; a part of the ball is exposed to the shell, the other part of the ball is located in the shell and contacts the spring; the shell is connected with the connecting plate.

In some embodiments, the limiter is fixed on the connecting plate.

In some embodiments, the outer surface of the rotating shaft includes threads; a nut is arranged in the connecting plate; the nut is connected with the rotating shaft; the shell is threaded with the connecting plate; a first wire hole is defined in the rotating shaft.

In some embodiments, the LED lamp further includes a middle component; the middle component includes a power box and an LED drive power located in the power box; the power box is long strip shaped; a first end cover is separately arranged on two ends of the power box; a second end cover is arranged on an end of the connecting tube, the first end cover is hinged with the second end cover.

In some embodiments, a middle portion of the first end cover is connected with a terminal; an "L"-shaped notch is separately defined in two opposite sides of the first end cover, and the second end cover is located in the "L"-shaped notch; a curved second wire hole is defined through a bottom wall of the "L"-shaped notch.

In some embodiments, the LED light module includes a heat sink, at least one LED light board mounted on the heat sink, and a lens board covering the LED light board.

An LED plant growth lamp, including two light frames, the two light frames being relatively rotatable to each other; each light frame including two connecting tubes, the two connecting tubes being opposite to and spaced with each other; and at least one LED light module, the at least one LED light module being rotatably connected between the two connecting tubes.

The irradiation angle of the LED light module can be adjusted to improve the growth efficiency and quality of plants.

It should be pointed out that the implementation of any product of the present disclosure does not need to achieve all the above effects at the same time.

BRIEF DESCRIPTION OF THE DRAWINGS

In order to more clearly illustrate the technical solutions of the embodiments of the present disclosure, the drawings used for illustrating the embodiments will be briefly described below. It should be understood that the following drawings merely illustrate some embodiments of the present disclosure. For those of ordinary skill in the art, other drawings can be obtained according to these drawings without any creative work.

DETAILED DESCRIPTION

Figure 1:
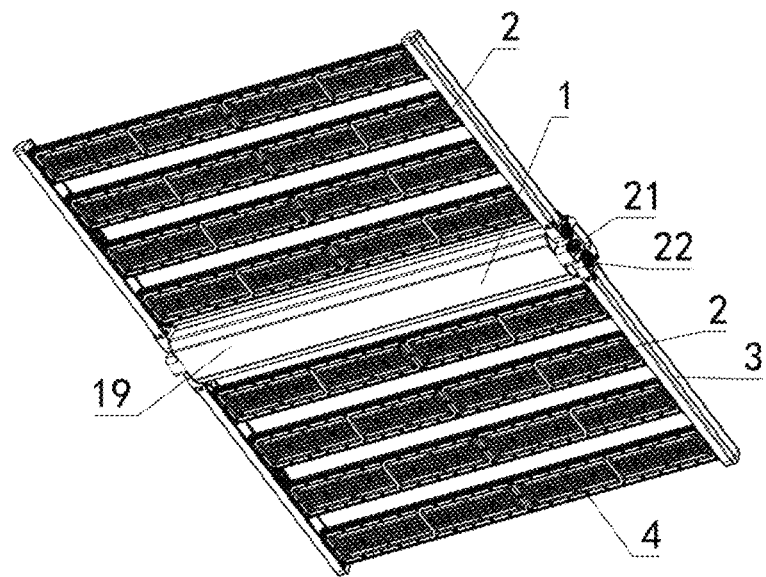
FIG. 1 illustrates a perspective view of an LED lamp according to an embodiment of the present disclosure.

In order to make the objects, technical solutions and advantages of the present disclosure clearer, the embodiments of the present disclosure will be further described in detail below with reference to the accompanying drawings. It should be understood that the specific embodiments described herein are only used to explain the present disclosure and do not limit the scope of protection of the present disclosure.

Referring to the embodiment of the present disclosure shown in FIG. 1 to FIG. 10, an LED lamp includes two light frames 2. The two light frames 2 are relatively rotatable to each other. Each light frame 2 includes two connecting tubes 3. The two connecting tubes 3 are opposite to and spaced with each other, and a plurality of LED light modules 4 are connected between the two connecting tubes 3. Each LED light module 4 is rotatably connected with the connecting tube 3. Since the LED light module 4 is rotatably connected with the connecting tube 3, the irradiation angle of each LED light module 4 can be adjusted according to different plant arrangements or different growth cycles of plants, to achieve flexible and accurate irradiation and to improve the growth efficiency and quality of plants.

In some embodiments, as shown in FIG. 1 to FIG. 4 and FIG. 10, the LED lamp further includes a middle component 1, and the two light frames 2 are respectively and rotatably connected on two opposite sides of the middle component 1, and thus the LED light modules 4 can also rotate relative to the middle component 1. Since the LED light modules 4 and the light frame 2 are rotatably connected to the middle component 1, the LED lamp can be folded to facilitate product packaging.

Further, because the two light frames 2 are respectively and rotatably connected on two sides of the middle component 1, the LED lamp can be conveniently adjusted, so that lighting intensity and irradiation angle of the LED lamp can be changed. Specifically, for example: if the two light frames 2 are folded, light of the two light frames 2 are combined to increase the light intensity; it can be understood that the angle between the two light frames 2 can be set, according to the need, such as 30 degrees, 45 degrees, 60 degrees, 75 degrees and so on; if fully expanding the two light frames 2, that is, an angle between the two light frames 2 is 180 degrees, the irradiation range increases; further, the two light frames 2 are respectively rotatably connected on two sides of the middle component 1, a whole irradiation angle of the two light frames 2 is defined by an angle between the two light frames 2 and irradiation angles of the two light frames 2 respectively; that is to say, after the irradiation angles of the two light frames 2 are set, the whole irradiation angle of the two light frames 2 can be adjusted by adjusting the angle between the two light frames 2. Compared with the configuration where the two light frames 2 are not respectively and rotatably connected to the middle component 1, this embodiment can obtain more irradiation angles for more flexible and precise irradiation of plants.

Figure 2:
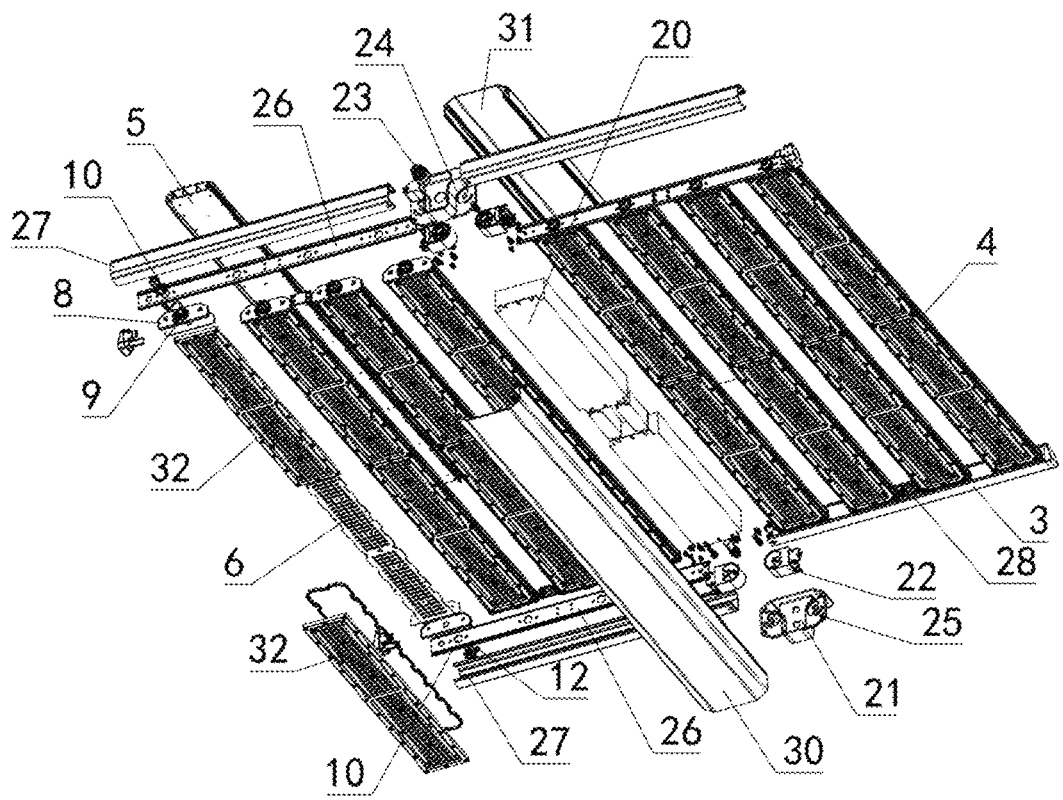
FIG. 2 illustrates an explosion diagram of the LED lamp of FIG. 1.
Figure 4:
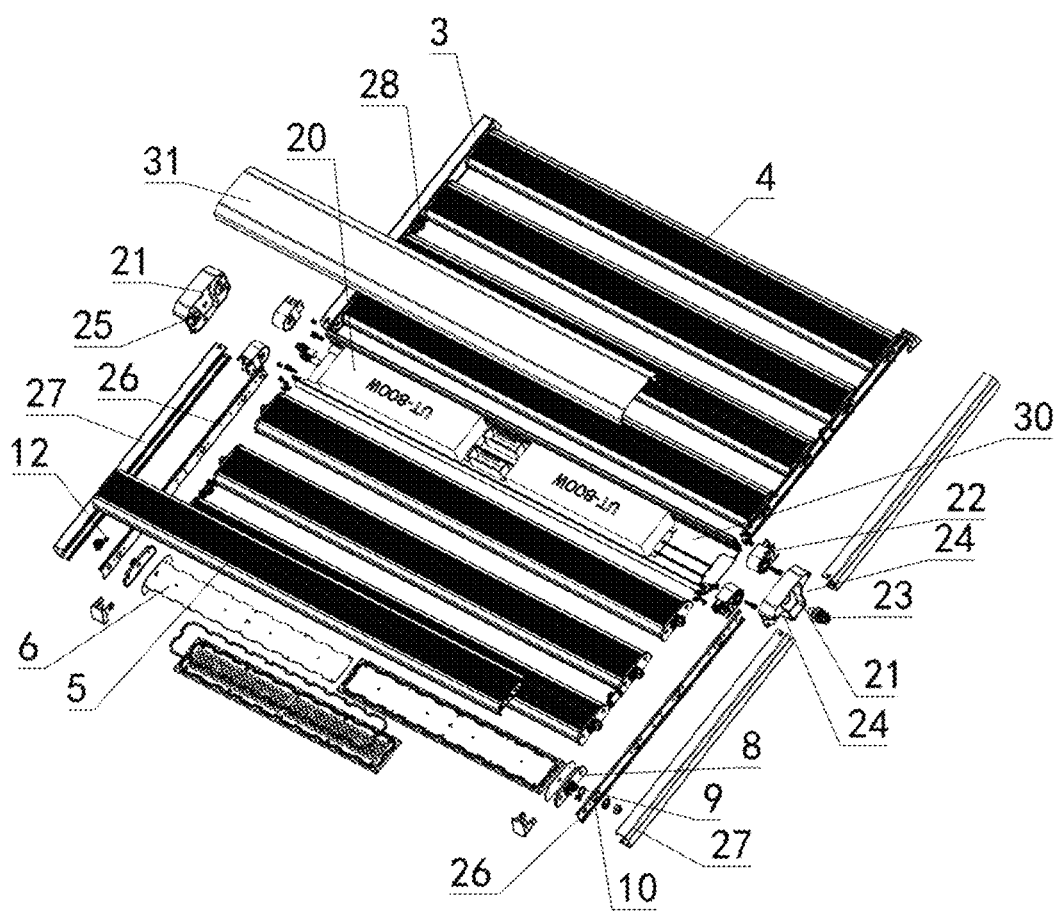
FIG. 4 illustrates an explosion diagram of the LED lamp of FIG. 3.
Figure 10:
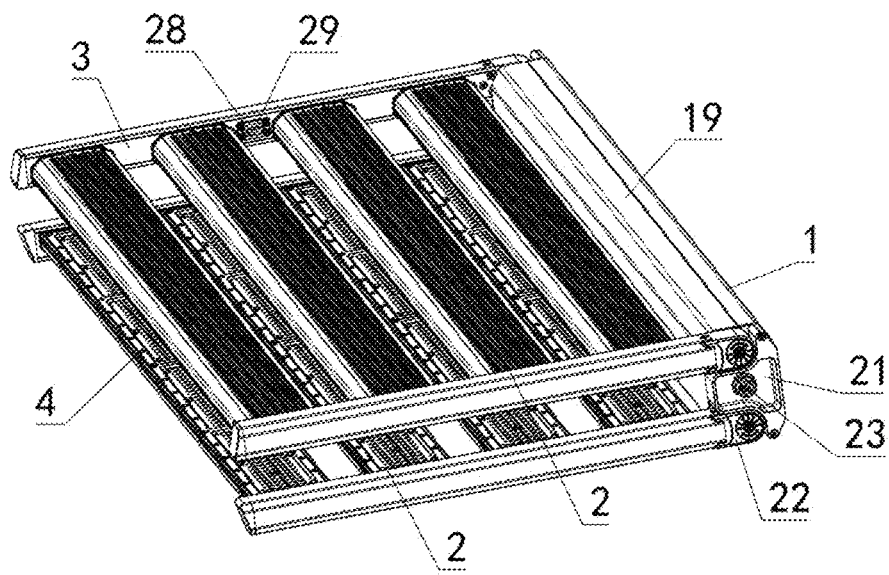
FIG. 10 illustrates a folding state diagram of the light frame according to an embodiment of present disclosure.

In some embodiments, as shown in FIG. 2, FIG. 4, and FIG. 10, the connecting tube 3 includes a connecting plate 26 and a cover plate 27 connected to the connecting plate 26.

Figure 5:
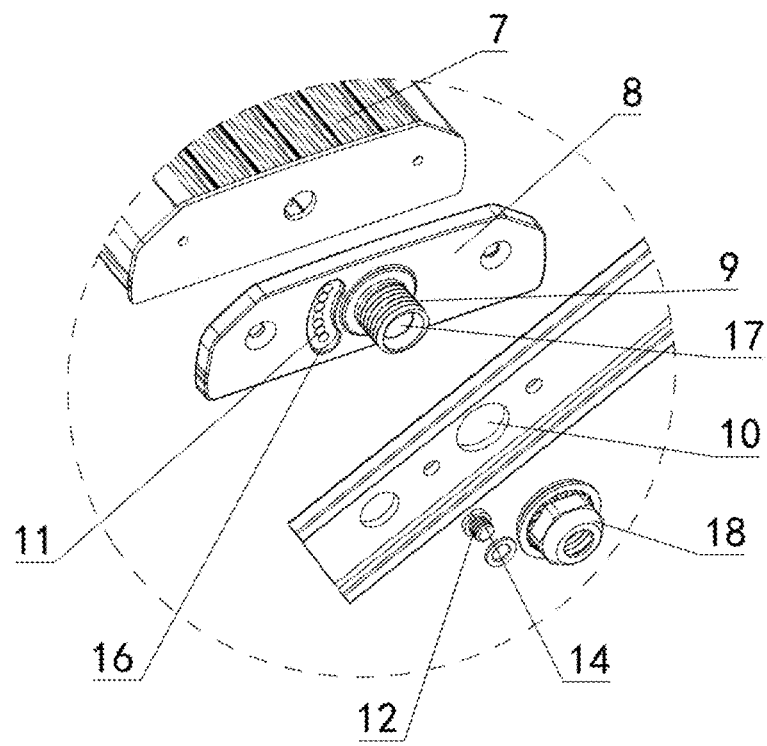
FIG. 5 illustrates an explosion diagram of a portion of the LED lamp according to an embodiment of the present disclosure.
Figure 6:
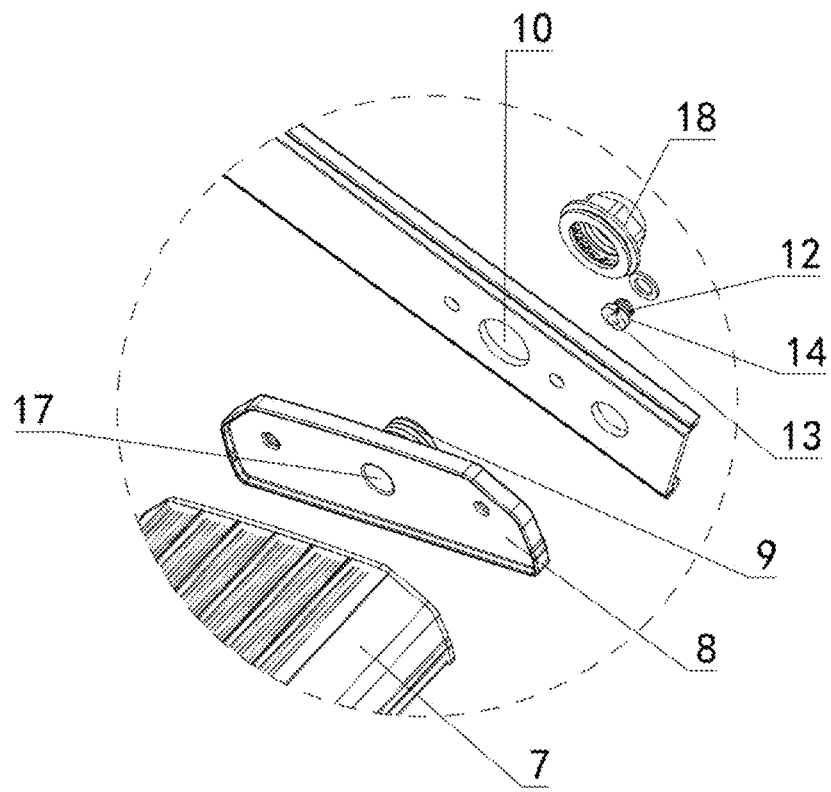
FIG. 6 illustrates an explosion diagram of another portion of the LED lamp according to an embodiment of the present disclosure.
Figure 7:
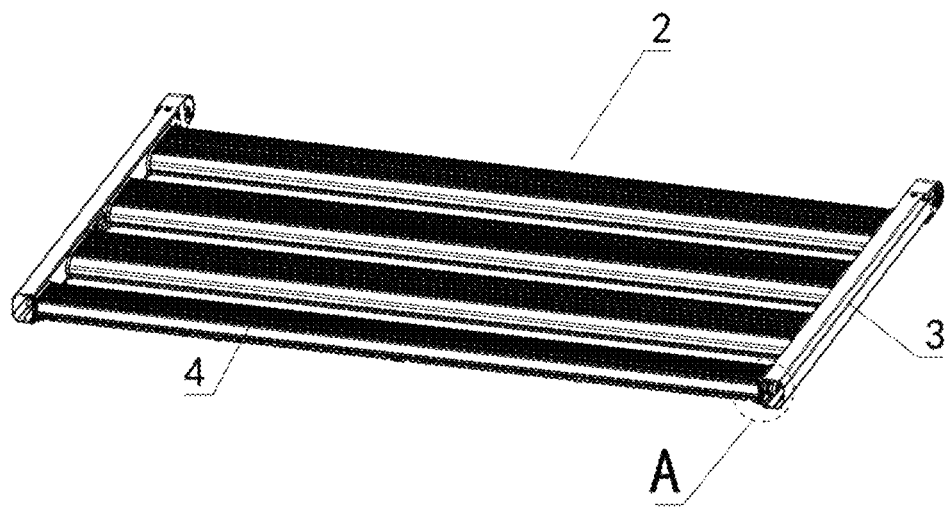
FIG. 7 illustrates a section diagram of a light frame according to an embodiment of present disclosure.

In some embodiments, as shown in FIG. 5 and FIG. 6, the LED light module 4 includes a lamp body 7 and a connector 8 connected with the lamp body 7. The connector 8 is fixedly arranged on an end of the lamp body 7. A rotating shaft 9 is arranged on the connector 8, and a shaft hole 10 is defined in the connecting plate 26; the rotating shaft 9 is inserted in the shaft hole 10. By rotating the rotating shaft 9, the connector 8 can be driven to rotate the lamp body 7, and then adjust the irradiation angle of the LED light module 4.

In some embodiments, as shown in FIG. 5, the connector 8 includes a plurality of concave surfaces 11 arranged along an arc line. In an embodiment, as shown in FIG. 5, the plurality of concave surfaces 11 are arranged in sequence along the circumferential direction of the rotating shaft 9, that is, the arc line is a line extended along the circumferential direction of the rotating shaft 9. In an embodiment, as shown in FIG. 5, the concave surfaces 11 are all part of a sphere, and the concave surfaces 11 are arranged successively to form a circular arc as a whole; the adjacent concave surfaces 11 are closely arranged. The diameter and depth of all of the concave surfaces 11 may be the same. Correspondingly, the connecting plate 26 is connected with a limiter 12. A ball 13 is retractably arranged on one end of the limiter 12, and the ball 13 can partly stretch out of the limiter 12 to be received in and contact with any of the concave surfaces 11. The ball 13 is matched with any of the concave surfaces, and the concave surface 11 can prevent further movement of the ball 13 to fix the rotation angle of the LED light module 4. By rotating the LED light module 4, the ball 13 can be retracted to slide out of the concave surface 11, and the ball 13 then can be stretched out to resist in another concave surface 11, so as to adjust or fix the irradiation angle of the LED light module 4.

In some embodiments, as shown in FIG. 5 and FIG. 6, the limiter 12 further includes a shell 14 and a spring 15 located in the shell 14. A part of the ball 13 is exposed in the shell 14, and another part of the ball 13 is located in the shell 14 and contacts the spring 15. The ball 13 can squeeze the spring 15 to compress and then retract itself, or the spring 15 can be returned so that the ball 13 can stretch out from the shell 14; that is, the ball 13 can be stretched out or retracted when the LED light module 4 is rotated. In some embodiments, as shown in FIG. 8, the shell 14 is connected to the connecting tube 3.

In some embodiments, as shown in FIG. 5, an arc groove 16 is defined on one surface of the connector 8 toward the connecting plate 26, and the opening of the arc groove 16 is arc-shaped. In one embodiment, the trend of the arc groove 16 is consistent with the whole arrangement direction of the concave surfaces 11, that is, the arc groove 16 is also arranged in the circumferential direction of the rotating shaft 9. Thus the concave surfaces 11 are all housed in the curved groove 16, and the arc length of the curved groove 16 is slightly greater than the length of the arc formed by the concave surfaces 11 as a whole. When the rotating shaft 9 is inserted in the shaft hole 10, a part of the shell 14 extends into the curved groove 16; when the LED light module 4 rotates to a certain angle, that is, when the ball 13 rotates to the far end of the concave surfaces 11, a part of the shell 14 will be blocked on the inner wall of the curved groove 16, so as to prevent the LED light module 4 from further rotating, and to prevent the LED light module 4 from pulling the power line due to excessive rotation; at the same time, it also makes the light frame 2 more compact.

In some embodiments, as shown in FIG. 5, the outer surface of the rotating shaft 9 includes threads. A nut 18 is arranged in the connecting plate 26. The nut 18 is connected with the rotating shaft 9 through the threads. The shell 14 is threaded with the connecting plate 26. A first wire hole 17 is defined in the rotating shaft 9.

Figure 8:
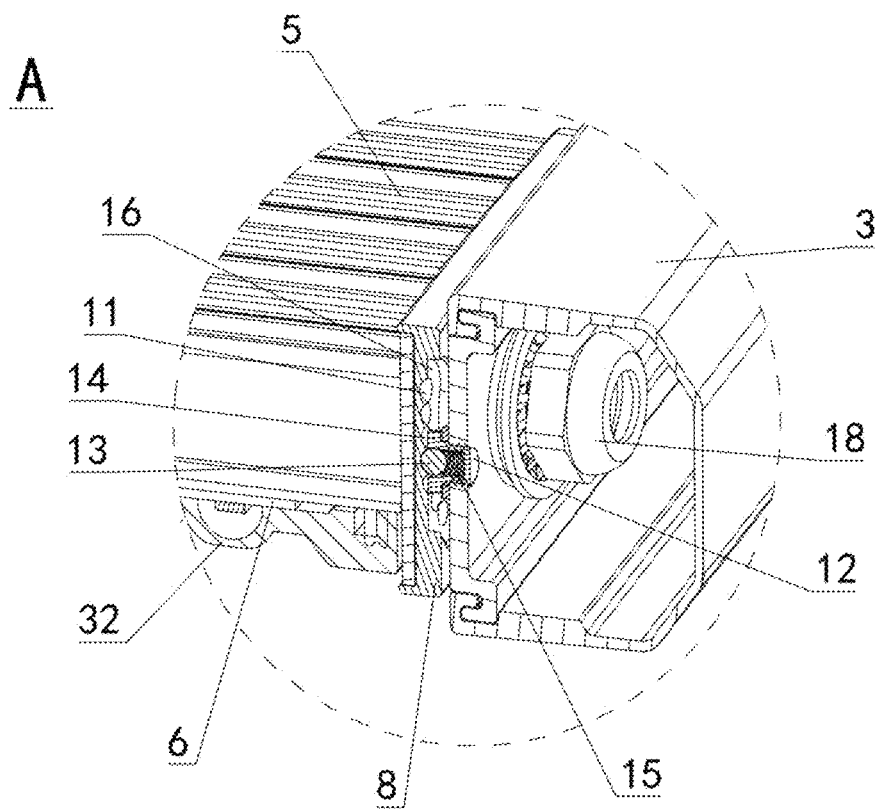
FIG. 8 illustrates a partial enlarged diagram on A of FIG. 7.
Figure 9:
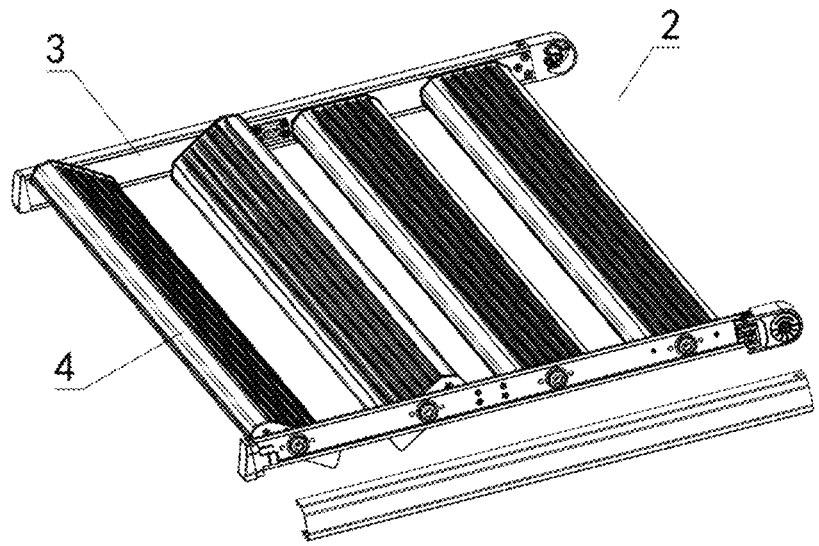
FIG. 9 illustrates an explosion diagram of the light frame according to an embodiment of present disclosure, showing a state of the LED light module after rotating a certain angle.

In some embodiments, as shown in FIG. 2, FIG. 4, and FIG. 8, the LED light module 4 includes a heat sink 5 and two LED light boards 6 mounted on the heat sink 5.

Figure 3:
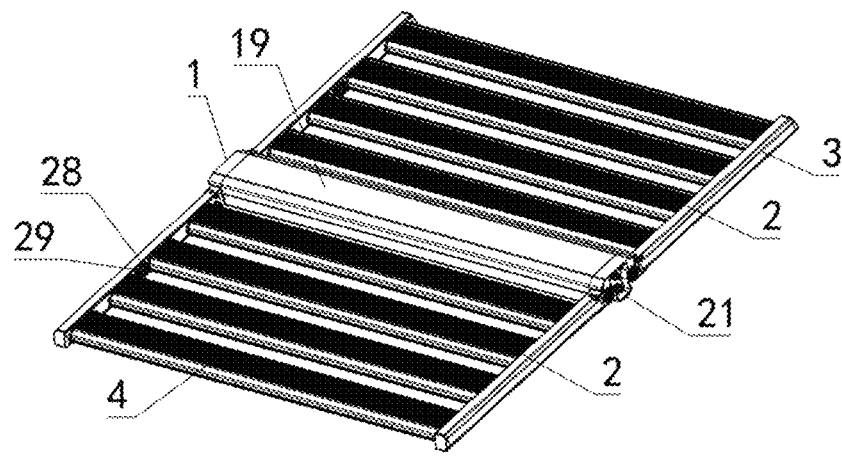
FIG. 3 illustrates a perspective view according to another angle of an LED lamp according to an embodiment of the present disclosure.

In some embodiments, as shown in FIG. 1 to FIG. 4, the middle component 1 includes a power box 19 and an LED drive power 20 located in the power box 19. The power box 19 is long strip shaped. A first end cover 21 is arranged on each end of the power box 19. In an embodiment, the extension direction of the connecting tube 3 is roughly perpendicular to the extension direction of the middle component 1, as shown in FIG. 1 to FIG. 3. A second end cover 22 is arranged on one end of the connecting tube 3 close to the power box 19. The first end cover 21 is hinged with the second end cover 22 to fold the light frames 2 to facilitate packaging and transportation.

In some embodiments, as shown in FIG. 2, FIG. 4 and FIG. 10, the middle part of the first end cover 21 is connected with a terminal 23. An "L"-shaped notch 24 is defined on each side of the first end cover 21, along an extension direction of the connecting tube 3, from the surface far away from the power box 19 to the surface close to the power box 19. The second end cover 22 is arranged in the "L"-shaped notch 24 and is hinged with the first end cover 21 to facilitate the folding of the light frame 2.

In some embodiments, as shown in FIG. 2 and FIG. 4, a second wire hole 25 is curved and is defined through a bottom wall of the "L"-shaped notch 24 to prevent a power cord received therein from being crushed.

In some embodiments, as shown in FIG. 2, FIG. 4 and FIG. 10, the inner side of the connecting plate 26 is connected with a pendant 28, and a hook hole 29 is defined in the pendant 28, which is used to hang the plant growth lamp on a hook, such as a hook of a hook rope, so that the plant growth lamp can be hung. The limiter 12 is fixed on the connecting plate 26. The power box 19 includes a base 30 and an upper cover 31 connected with the base 30. The LED light module 4 further includes a plurality of lens boards 32 correspondingly covering the LED light boards 6.

Beneficial effects of the above embodiments: the irradiation angle of the LED light module 4 can be adjusted, and thus the growth efficiency and quality of plants can be improved. At the same time, the LED lamp can be folded for convenient packaging and transportation.

The above shows and describes the basic principle, main characteristics and advantages of the disclosure. The technical personnel in the field should understand that the disclosure is not limited by the above embodiments, and that the embodiments and descriptions in the above embodiments and specifications only state the principle of the disclosure, and that the disclosure is subject to various changes and improvements on the premise of not deviating from the spirit and scope of the disclosure, and these changes and improvements fall within the scope of the disclosure requiring protection. The scope of protection required by the present disclosure is defined by the attached claims and their equivalents.

At the same time, the attached drawings are for illustrative purposes only, and are only schematic drawings rather than physical drawings, which cannot be construed as limitations of this disclosure. In order to better illustrate embodiments of the disclosure, some parts in the drawings are omitted, enlarged or reduced, which does not represent the size of the actual product. For those skilled in the field, it is understandable that some of the well-known structures and descriptions in the attached drawings may be omitted.

Furthermore, the same or similar labels in the drawings attached to embodiments of the disclosure correspond to the same or similar components; In the description of the disclosure, it should be understood that if the terms "up", "down", "front", "back", "left", "right", "vertical", "horizontal", "horizontal", "vertical", "top", "bottom", "inside", "outside", etc. indicate a bearing or position relationship based on the bearing or position relationship shown in the attached drawing, Only to facilitate the description of the disclosure and simplify the description, but not to indicate or imply that the device or element referred to must have a specific orientation, construction and operation in a specific orientation, therefore, the wording describing the position relationship in the attached drawings is for illustrative purposes only and shall not be construed as a limitation of the disclosure.

What is claimed is:

1. An LED lamp, comprising:
   a middle component; and
   two light frames, the two light frames being respectively and rotatably connected on two sides of the middle component; each light frame comprising:
   two connecting tubes, the two connecting tubes being opposite to and spaced with each other; and
   at least one LED light module, the at least one LED light module being rotatably connected between the two connecting tubes; and wherein
   the LED light module comprises a lamp body and a connector connected with the lamp body: a rotating shaft is arranged on the connector; the connecting tube comprises a connecting plate and a cover plate connected to the connecting plate; a shaft hole is defined in the connecting plate; the rotating shaft is inserted in the shaft hole.

2. The LED lamp of claim 1, wherein the connector comprises a plurality of concave surfaces arranged along the circumference of the rotating shaft; the connecting plate is connected with a limiter, and a ball is retractably arranged on one end of the limiter; the ball is matched with any of the concave surfaces to be received in a space formed by any of the concave surfaces.

3. The LED lamp of claim 2, wherein the limiter comprises a shell and a spring located in the shell; a part of the ball is exposed to the shell, the other part of the ball is located in the shell and contacts the spring; the shell is connected with the connecting plate.

4. The LED lamp of claim 3, wherein an arc groove is defined in the connector; the plurality of concave surfaces are located in the arc groove, and a part of the shell extends into the arc groove.

5. The LED lamp of claim 4, wherein the outer surface of the rotating shaft comprises threads; a nut is arranged in the connecting plate; the nut is connected with the rotating shaft; the shell is threaded with the connecting plate; a first wire hole is defined in the rotating shaft.

6. The LED lamp of claim 1, wherein the middle component comprises a power box and an LED drive power located in the power box; the power box is long strip shaped; a first end cover is separately arranged on two ends of the power box; a second end cover is arranged on an end of the connecting tube; the first end cover is hinged with the second end cover.

7. The LED lamp of claim 6, wherein a middle portion of the first end cover is connected with a terminal; an "L"-shaped notch is separately defined in two opposite sides of the first end cover, and each second end cover is located in one "L"-shaped notch.

8. The LED lamp of claim 7, wherein a second wire hole is curved and is defined through a bottom wall of the "L"-shaped notch.

9. The LED lamp of claim 1, wherein the connecting tube comprises a connecting plate and an outer cover plate; an inner side of the connecting plate is connected with a pendant; a hook hole is defined in the pendant; the limiter is fixed on the connecting plate; the power box comprises a base and an upper cover connected with the base; the LED light module comprises a heat sink, at least one LED light board mounted on the heat sink, and a lens board covering the LED light board.

10. An LED lamp, comprising two light frames, the two light frames being relatively rotatable to each other; each light frame comprising:
    two connecting tubes, the two connecting tubes being opposite to and spaced with each other; and
    at least one LED light module, the at least one LED light module being rotatably connected between the two connecting tubes.

11. The LED lamp of claim 10, wherein the LED light module comprises a lamp body and a connector connected with the lamp body; a rotating shaft is arranged on the connector; the connecting tube comprises a connecting plate and a cover plate connected to the connecting plate; a shaft hole is defined in the connecting plate; the rotating shaft is inserted in the shaft hole.

12. The LED lamp of claim 11, wherein the connector comprises a plurality of concave surfaces arranged along the circumference of the rotating shaft; the connecting plate is connected with a limiter, and a ball is retractably arranged on one end of the limiter; the ball is matched with any of the concave surfaces to be received in a space formed by any of the concave surfaces.

13. The LED lamp of claim 12, wherein an arc groove is defined in the connector; the plurality of concave surfaces are located in the arc groove, and a part of the shell extends into the arc groove.

14. The LED lamp of claim 12, wherein the limiter comprises a shell and a spring located in the shell; a part of the ball is exposed to the shell, the other part of the ball is located in the shell and contacts the spring; the shell is connected with the connecting plate.

15. The LED lamp of claim 12, wherein the limiter is fixed on the connecting plate.

16. The LED lamp of claim 11, wherein the outer surface of the rotating shaft comprises threads; a nut is arranged in the connecting plate; the nut is connected with the rotating shaft; the shell is threaded with the connecting plate; a first wire hole is defined in the rotating shaft.

17. The LED lamp of claim 10, further comprising a middle component; wherein the middle component comprises a power box and an LED drive power located in the power box; the power box is long strip shaped; a first end cover is separately arranged on two ends of the power box; a second end cover is arranged on an end of the connecting tube, the first end cover is hinged with the second end cover.

18. The LED lamp of claim 17, wherein a middle portion of the first end cover is connected with a terminal; an "L"-shaped notch is separately defined in two opposite sides of the first end cover, and the second end cover is located in the "L"-shaped notch; a curved second wire hole is defined through a bottom wall of the "L"-shaped notch.

19. The LED lamp of claim 10, wherein the LED light module comprises a heat sink, at least one LED light board mounted on the heat sink, and a lens board covering the LED light board.

* * * * *